(12) United States Patent
Nakamoto et al.

(10) Patent No.: US 11,050,088 B2
(45) Date of Patent: Jun. 29, 2021

(54) LIQUID ELECTROLYTE FOR FLUORIDE ION BATTERY AND FLUORIDE ION BATTERY

(71) Applicants: TOYOTA JIDOSHA KABUSHIKI KAISHA, Toyota (JP); KYOTO UNIVERSITY, Kyoto (JP)

(72) Inventors: Hirofumi Nakamoto, Kyoto (JP); Zempachi Ogumi, Kyoto (JP); Takeshi Abe, Kyoto (JP)

(73) Assignees: TOYOTA JIDOSHA KABUSHIKI KAISHA, Toyota (JP); KYOTO UNIVERSITY, Kyoto (JP)

(*) Notice: Subject to any disclaimer, the term of this patent is extended or adjusted under 35 U.S.C. 154(b) by 332 days.

(21) Appl. No.: 15/609,677

(22) Filed: May 31, 2017

(65) Prior Publication Data
US 2017/0352921 A1    Dec. 7, 2017

(30) Foreign Application Priority Data

Jun. 2, 2016    (JP) .............................. JP2016-111040

(51) Int. Cl.
*H01M 10/0569*    (2010.01)
*H01M 10/05*    (2010.01)
*H01M 10/0568*    (2010.01)

(52) U.S. Cl.
CPC ....... *H01M 10/0569* (2013.01); *H01M 10/05* (2013.01); *H01M 10/0568* (2013.01); *H01M 2220/20* (2013.01); *H01M 2300/0037* (2013.01)

(58) Field of Classification Search
CPC ......... H01M 10/0569; H01M 10/0568; H01M 10/05; H01M 2220/20; H01M 2300/0037; Y02E 60/10
See application file for complete search history.

(56) References Cited

U.S. PATENT DOCUMENTS

| | | | | |
|---|---|---|---|---|
| 7,722,993 | B2* | 5/2010 | Potanin | H01M 4/0492 429/218.1 |
| 9,166,249 | B2* | 10/2015 | Darolles | H01M 6/164 |
| 9,331,360 | B2* | 5/2016 | Weiss | H01M 4/5835 |
| 2005/0164087 | A1 | 7/2005 | Fujita et al. | |
| 2006/0269834 | A1 | 11/2006 | West et al. | |
| 2011/0143219 | A1 | 6/2011 | Weiss et al. | |
| 2012/0270076 | A9* | 10/2012 | Yazami | H01M 4/38 429/50 |

(Continued)

FOREIGN PATENT DOCUMENTS

| JP | 10-012274 A | 1/1998 |
|---|---|---|
| JP | 2008-543002 A | 11/2008 |

(Continued)

*Primary Examiner* — Kwang Han
(74) *Attorney, Agent, or Firm* — Sughrue Mion, PLLC

(57) ABSTRACT

An object of the present disclosure is to provide a liquid electrolyte for a fluoride ion battery in which decomposition of a solvent is restrained. The present disclosure attains the object by providing a liquid electrolyte for a fluoride ion battery comprising a plurality of carbonate-based solvents and a fluoride salt, wherein the plurality of carbonate-based solvents contain: i) only propylene carbonate (PC) and dimethyl carbonate (DMC), ii) only ethylene carbonate (EC) and ethyl methyl carbonate (EMC), or iii) only ethyl methyl carbonate (EMC) and dimethyl carbonate (DMC).

17 Claims, 4 Drawing Sheets

(56) References Cited

U.S. PATENT DOCUMENTS

| | | | | |
|---|---|---|---|---|
| 2013/0273422 A1* | 10/2013 | Wegner | ................... | H01M 4/04 |
| | | | | 429/212 |
| 2014/0234732 A1* | 8/2014 | Park | ..................... | H01M 4/134 |
| | | | | 429/405 |
| 2016/0285129 A1 | 9/2016 | Nakamoto et al. | | |

FOREIGN PATENT DOCUMENTS

| JP | 2009-163971 A | 7/2009 |
|---|---|---|
| JP | 2010-500725 A | 1/2010 |
| JP | 2013-020749 A | 1/2013 |
| JP | 2013-145758 A | 7/2013 |
| WO | WO 01/022519 A1 | 4/2003 |
| WO | 2006/128174 A2 | 11/2006 |
| WO | 2007/146453 A2 | 12/2007 |
| WO | 2008/105916 A2 | 9/2008 |
| WO | 2015/093272 A1 | 6/2015 |

* cited by examiner

LIQUID ELECTROLYTE FOR FLUORIDE ION BATTERY AND FLUORIDE ION BATTERY

TECHNICAL FIELD

The present disclosure relates to a liquid electrolyte for a fluoride ion battery in which decomposition of a solvent is restrained.

BACKGROUND ART

Li ion batteries have been known as a battery with a high voltage and high energy density for example. The Li ion battery is a cation based battery utilizing the reaction of Li ions with cathode active materials, and the reaction of Li ions with anode active materials. On the other hand, fluoride ion batteries have been known as an anion based battery that utilizes the reaction of fluoride ions (fluoride anions).

For example, Patent Literature 1 discloses an electrochemical cell (fluoride ion battery) comprising a cathode, an anode, and an electrolyte material capable of conducting anion charge carriers ($F^-$). Also, as the solvent of a liquid electrolyte, Patent Literature 1 discloses carbonate-based solvents such as propylene carbonate (PC), ethylene carbonate (EC), ethylmethyl carbonate (EMC), and dimethyl carbonate (DMC).

CITATION LIST

Patent Literature

Patent Literature 1: Japanese Patent Application Laid-Open No. 2013-145758

SUMMARY OF DISCLOSURE

Technical Problem

Carbonate-based solvents are low in stability against reduction and decomposition therein easily occurs. The present disclosure has been made in view of the actual circumstances, and a main object thereof is to provide a liquid electrolyte for a fluoride ion battery in which decomposition of a solvent is restrained. Incidentally, in a fluoride ion battery, conducting a fluoride ion ($F^-$) alone is not easy; thus, there may be some cases to conduct thereof as a fluoride anion (such as a fluoride complex anion). In light of this point, in the present disclosure, the term "fluoride anion" may be used instead of a fluoride ion in some cases.

Solution to Problem

To achieve the above object, the present disclosure provides a liquid electrolyte for a fluoride ion battery comprising a plurality of carbonate-based solvents and a fluoride salt, wherein the plurality of carbonate-based solvents contain: i) only propylene carbonate (PC) and dimethyl carbonate (DMC), ii) only ethylene carbonate (EC) and ethyl methyl carbonate (EMC), or iii) only ethyl methyl carbonate (EMC) and dimethyl carbonate (DMC).

According to the present disclosure, selecting the combination of the specific carbonate-based solvents allows a liquid electrolyte for a fluoride ion battery in which decomposition of the solvent is restrained.

In the disclosure, the plurality of carbonate-based solvents may contain only propylene carbonate (PC) and dimethyl carbonate (DMC).

In the disclosure, the plurality of carbonate-based solvents may contain only ethylene carbonate (EC) and ethyl methyl carbonate (EMC).

In the disclosure, the plurality of carbonate-based solvents may contain only ethyl methyl carbonate (EMC) and dimethyl carbonate (DMC).

Also, the present disclosure provides a fluoride ion battery comprising a cathode active material layer, an anode active material layer, and an electrolyte layer formed between the cathode active material layer and the anode active material layer, wherein the electrolyte layer contains the above described liquid electrolyte for a fluoride ion battery.

According to the present disclosure, usage of the above described liquid electrolyte for a fluoride ion battery allows a fluoride ion battery to have favorable cycle stability.

Advantageous Effects of Disclosure

The present disclosure exhibits effects such as to provide a liquid electrolyte in which decomposition of a solvent is restrained.

DESCRIPTION OF EMBODIMENTS

Figure 1:
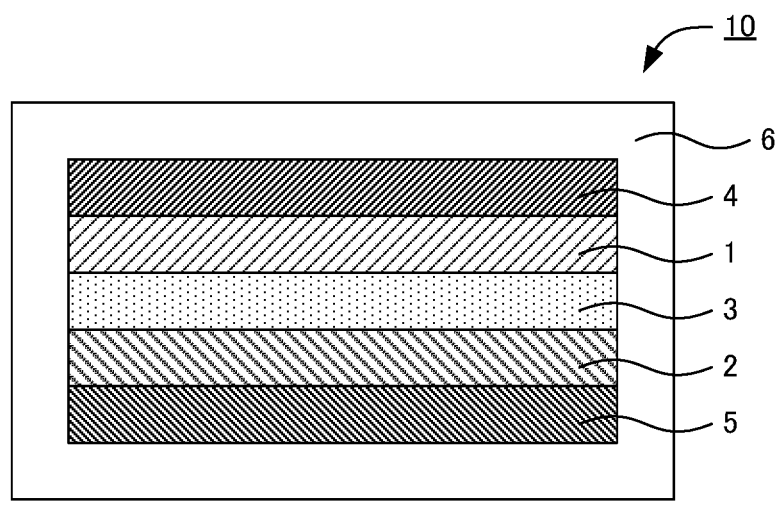
FIG. 1 is a schematic cross sectional view illustrating an example of the fluoride ion battery of the present disclosure.

The liquid electrolyte for a fluoride ion battery and the fluoride ion battery of the present disclosure are hereinafter described in details.

A. Liquid Electrolyte for Fluoride Ion Battery

The liquid electrolyte for a fluoride ion battery of the present disclosure comprises a plurality of carbonate-based solvents and a fluoride salt, wherein the plurality of carbonate-based solvents contain: i) only propylene carbonate (PC) and dimethyl carbonate (DMC), ii) only ethylene carbonate (EC) and ethyl methyl carbonate (EMC), or iii) only ethyl methyl carbonate (EMC) and dimethyl carbonate (DMC).

According to the present disclosure, selecting the combination of the specific carbonate-based solvents allows a liquid electrolyte for a fluoride ion battery in which decomposition of the solvent is restrained. As described above, carbonate-based solvents are low in stability against reduction and decomposition therein easily occurs. Accordingly, the charge and discharge efficiency (coulomb efficiency) tends to be low, which is particularly due to the anode side. Also, the decomposition is presumed to be caused by a carbonate-based solvent reacting with active fluoride anions produced from the anode active material at the time of the charge.

On the contrary, in the present disclosure, the decomposition of a carbonate-based solvent can be restrained by selecting the combination of the specific carbonate-based solvents. The reason therefor is presumed to be as follows. Since the combination of the specific carbonate-based solvents is selected, a stable solid electrolyte interphase (SEI layer) is formed on the surface of the active material, and thus the decomposition of the carbonate-based solvent is restrained from proceeding. Also, the formation of the stable SEI layer restrains the occurrence of side reactions involved in the decomposition of the solvent due to the active fluoride anions to be restrained. As the result, the charge and discharge efficiency (coulomb efficiency) is presumed to be improved.

The liquid electrolyte for a fluoride ion battery of the present disclosure is hereinafter described in each constitution.

1. Carbonate-Based Solvent

The liquid electrolyte for a fluoride ion battery in the present disclosure contains a plurality of carbonate-based solvents, wherein the plurality of carbonate-based solvents contain: i) only propylene carbonate (PC) and dimethyl carbonate (DMC), ii) only ethylene carbonate (EC) and ethyl methyl carbonate (EMC), or (iii) only ethyl methyl carbonate (EMC) and dimethyl carbonate (DMC).

Incidentally, the term "only" in i) to iii) does not mean strictly only specific carbonate-based solvents, but also means that additional carbonate-based solvent may be included to the extent that the desired effect can be obtained. In the latter case, the proportion of the additional carbonate-based solvent with respect to all the carbonate-based solvents is, for example, 5 mol % or less, may be 1 mol % or less, and may be 0 mol %.

Regarding i) to iii), the proportion of each carbonate-based solvent is not particularly limited. As described above, it is presumed that the formation of the stable SEI layer is important to improve the charge and discharge efficiency (coulomb efficiency), and the combination of the carbonate-based solvents directly contributes to the formation of the stable SEI layer; thus similar effect can be obtained regardless of the proportion. However, in the case i), the proportion of PC with respect to the total of PC and DMC (PC/(PC+DMC)) is 15 mol % or more for example, and preferably 25 mol % or more. If the proportion of PC is too small, the SEI layer could become uneven but not stable. Meanwhile, the proportion of PC is 75 mol % or less for example, and preferably 67 mol % or less. If the proportion of PC is too large, decomposition of PC is prioritized and the resistance of the SEI layer could be increased.

In the case (ii), the proportion of EC with respect to the total of EC and EMC (EC/(EC+EMC)) is 15 mol % or more for example, and preferably 25 mol % or more. If the proportion of EC is too small, the SEI layer could become uneven but not stable. Meanwhile, the proportion of EC is 75 mol % or less for example, and preferably 67 mol % or less. If the proportion of EC is too large, decomposition of EC is prioritized and the resistance of the SEI layer could be increased.

In the case (iii), the proportion of EMC with respect to the total of EMC and DMC (EMC/(EMC+DMC)) is 15 mol % or more for example, and preferably 25 mol % or more. If the proportion of EMC is too small, the SEI layer could become uneven but not stable. Meanwhile, the proportion of EMC is 75 mol % or less for example, and preferably 67 mol % or less. If the proportion of EMC is too large, the SEI layer could become uneven but not stable.

The liquid electrolyte for a fluoride ion battery in the present disclosure may contain only the carbonate-based solvents as the solvent, and may further contain additional solvent. In the latter case, the proportion of the carbonate-based solvents with respect to all the solvents may be 50 mol % or more, may be 70 mol % or more, and may be 90 mol % or more.

Examples of the additional solvent may include glyme represented by the general formula $R^1$—$O(CH_2CH_2O)_n$—$R^2$ ($R^1$ and $R^2$ are each independently an alkyl group with carbon number 4 or less, or a fluoroalkyl group with carbon number 4 or less, and "n" is in a range of 2 to 10). Specific examples of the glyme may include diethylene glycol diethyl ether (G2), triethylene glycol dimethyl ether (G3), tetraethylene glycol dimethyl ether (G4), diethylene glycol dibutyl ether, diethylene glycolmethyl ethyl ether, triethylene glycolmethyl ethyl ether, and triethylene glycol butyl methyl ether.

Other examples of the additional solvent may include chain ether such as diethyl ether, 1,2-dimetoxymethane, and 1,3-dimetoxypropane; cyclic ether such as tetrahydrofuran and 2-methyltetrahydrofuran; cyclic sulfone such as sulfolane; chain sulfone such as dimethylsulfoxide (DMSO); cyclic ester such as γ-butyrolactone; and nitrile such as acetonitrile.

2. Fluoride Salt

The fluoride salt in the present disclosure is usually a salt in which fluoride ions are anion components. The fluoride salt may be fully dissolved in a solvent and may be partially dissolved in a solvent (undissolved portion may be present). Also, the fluoride salt may be an organic fluoride salt, may be an inorganic fluoride salt, and may be an ionic solution.

An example of the cation of the fluoride salt is an alkali metal element. In this case, the fluoride salt may be represented by MF (M is an alkali metal element). Examples of the alkali metal element may include Li, Na, K, Rb, and Cs, and above all, Li, Na, and Cs are preferable.

Additional example of the cation of the fluoride salt is a complex cation. Examples of the complex cation may include alkylammonium cation, alkylphosphonium cation, and alkylsulfonium cation. Examples of the alkylammonium cation may include a cation represented by the general formula $NR^1R^2R^3R^4$. In the general formula, $R^1$ to $R^4$ are each independently an alkyl group or a fluoroalkyl group. The carbon number of $R^1$ to $R^4$ is, for example, 10 or less, may be 5 or less, and may be 3 or less.

3. Liquid Electrolyte for Fluoride Ion Battery

The liquid electrolyte for a fluoride ion battery in the present disclosure comprises at least a plurality of carbonate-based solvents and a fluoride salt. In addition, the liquid electrolyte for a fluoride ion battery may further comprise a fluoride complex salt. The reason therefor is to improve the activity of fluorinating the active materials. The fluoride complex salt refers to a salt having a fluoride complex anion with fluoride ions oriented in the central element (such as P or B) as the anion component. Examples of the fluoride complex salt may include $LiPF_6$ and $LiBF_4$.

Here, in the liquid electrolyte for a fluoride ion battery, the amount of the solvents is regarded as A (mol), the amount of the fluoride complex salt is regarded as B (mol), and the amount of the fluoride salt is regarded as C (mol). The proportion of the fluoride complex salt with respect to the solvents B/A is usually 0.125 or more, may be 0.17 or more, and may be 0.20 or more. Meanwhile, B/A is 1 or less for example, and may be 0.5 or less.

Also, the proportion of the fluoride salt with respect to the solvents C/A is 0.01 or more for example, and may be 0.05 or more. Meanwhile, C/A is 0.5 or less for example, and may be 0.125 or less. Also, the proportion of the fluoride salt with respect to the fluoride complex salt C/B is 0.05 or more for example, and may be 0.10 or more. Meanwhile, C/B is 1 or less for example, and may be 0.46 or less.

Incidentally, in an $F(HF)_x^-$ anion, $F^-$ has difficulty dissociating from HF. Accordingly, sufficient fluorination of the active materials may be difficult in some cases. Incidentally, "x" is a real number larger than 0, and satisfies $0<x\leq 5$, for example. Thus, the liquid electrolyte for a fluoride ion battery preferably does not substantially contain the $F(HF)_x^-$ anion. "Not substantially containing the $F(HF)_x^-$ anion" means that the proportion of the $F(HF)_x^-$ anion with respect to all the anions present in the liquid electrolyte is 0.5 mol % or less. The proportion of the $F(HF)_x^-$ anion is preferably 0.3 mol % or less.

B. Fluoride Ion Battery

FIG. 1 is a schematic cross sectional view illustrating an example of the fluoride ion battery of the present disclosure. Fluoride ion battery 10 shown in FIG. 1 comprises cathode active material layer 1, anode active material layer 2, electrolyte layer 3 formed between cathode active material layer 1 and anode active material layer 2, cathode current collector 4 for collecting currents of cathode active material layer 1, anode current collector 5 for collecting currents of anode active material layer 2, and battery case 6 for storing these members.

According to the present disclosure, usage of the above described liquid electrolyte for a fluoride ion battery allows a fluoride ion battery to have favorable cycle stability.

The fluoride ion battery of the present disclosure is hereinafter described in each constitution.

1. Electrolyte Layer

The electrolyte layer in the present disclosure is a layer to be formed between the cathode active material layer and the anode active material layer. In the present disclosure, the electrolyte layer contains the above described liquid electrolyte for a fluoride ion battery. The thickness of the electrolyte layer is not particularly limited.

2. Cathode Active Material Layer

The cathode active material layer in the present disclosure is a layer containing at least a cathode active material. Also, the cathode active material layer may further contain at least one of a conductive material and a binder other than the cathode active material.

Examples of the cathode active material in the present disclosure may include a simple substance of metal, an alloy, a metal oxide, and fluorides thereof. Examples of the metal element to be contained in the cathode active material may include Cu, Ag, Ni, Co, Pb, Ce, Mn, Au, Pt, Rh, V, Os, Ru, Fe, Cr, Bi, Nb, Sb, Ti, Sn, and Zn. Above all, the cathode active material is preferably Cu, $CuF_x$, Fe, $FeF_x$, Ag, and $AgF_x$. Incidentally, the "x" is a real number larger than 0. Also, other examples of the cathode active material may include carbon materials and fluorides thereof. Examples of the carbon material may include graphite, coke, and carbon nanotube. Also, additional examples of the cathode active material may include polymeric materials. Examples of the polymeric material may include polyaniline, polypyrrole, polyacetylene, and polythiophene.

The conductive material is not particularly limited if it has the desired electron conductivity, and examples thereof may include carbon materials, and examples of the carbon material may include carbon blacks such as acetylene black, Ketjen black, furnace black and thermal black; graphene, fullerene, and carbon nanotube. Meanwhile, the binder is not particularly limited if it is chemically and electronically stable, and examples thereof may include fluorine-based binders such as polyvinylidene fluoride (PVDF) and polytetrafluoroethylene (PTFE).

Also, the content of the cathode active material in the cathode active material layer is preferably larger from the viewpoint of the capacity; for example, the content is 30 weight % or more, preferably 50 weight % or more, and more preferably 70 weight % or more. Also, the thickness of the cathode active material layer is not particularly limited.

3. Anode Active Material Layer

The anode active material layer in the present disclosure is a layer containing at least an anode active material. Also, the anode active material layer may further contain at least one of a conductive material and a binder other than the anode active material.

Examples of the anode active material in the present disclosure may include a simple substance of metal, an alloy, a metal oxide, and fluorides thereof. Examples of the metal element to be contained in the anode active material may include La, Ca, Al, Eu, Li, Si, Ge, Sn, In, V, Cd, Cr, Fe, Zn, Ga, Ti, Nb, Mn, Yb, Zr, Sm, Ce, Mg, and Pb. Above all, the anode active material is preferably Mg, $MgF_x$, Al, $AlF_x$, Ce, $CeF_x$, Ca, $CaF_x$, Pb, and $PbF_x$. Incidentally, the "x" is a real number larger than 0. Also, the above described carbon materials and polymeric materials may be used as the anode active material.

Regarding the conductive material and the binder, the same materials described in "2. Cathode active material layer" above may be used. Also, the content of the anode active material in the anode active material layer is preferably larger from the viewpoint of the capacity; for example, the content is 30 weight % or more, preferably 50 weight % or more, and more preferably 70 weight % or more. Also, the thickness of the anode active material layer is not particularly limited.

4. Other Constitutions

The fluoride ion battery of the present disclosure comprises at least the above described cathode active material layer, anode active material layer, and electrolyte layer. The battery usually further comprises a cathode current collector for collecting currents of the cathode active material layer, and an anode current collector for collecting currents of the anode active material layer. Examples of the shape of the current collectors may include a foil shape, a mesh shape, and a porous shape. Also, the fluoride ion battery of the present disclosure may comprise a separator between the cathode active material layer and the anode active material layer. The reason therefor is to obtain a battery with higher safety.

5. Fluoride Ion Battery

The fluoride ion battery of the present disclosure may be a primary battery and may be a secondary battery, but preferably is a secondary battery among them, so as to be repeatedly charged and discharged and useful as a car mounted battery for example. Also, examples of the shape of the fluoride ion battery may include a coin shape, a laminate shape, a cylindrical shape, and a square shape.

Incidentally, the present disclosure is not limited to the embodiments. The embodiments are exemplification, and other variations are intended to be included in the technical scope of the present disclosure if they have substantially the same constitution as the technical idea described in the claim of the present disclosure and offer similar operation and effect thereto.

EXAMPLES

The present disclosure is hereinafter described in more details with reference to Examples. Incidentally, production of the samples and evaluation were conducted in a glove box under an Ar atmosphere with the dew point of −95° C. or less and $O_2$ concentration of 0.5 ppm or less.

Example 1

Propylene carbonate (PC, manufactured by Kishida Chemical Co., Ltd.), dimethyl carbonate (DMC, manufactured by Kishida Chemical Co., Ltd.), lithium hexafluorophosphate ($LiPF_6$, manufactured by Kishida Chemical Co., Ltd.), and lithium fluoride (LiF, manufactured by JAPAN PURE CHEMICAL CO., LTD.) were weighed and mixed so as to be PC:DMC:$LiPF_6$:LiF=10:10:5:1 at the molar ratio, and then stirred at 30° C. in a sealed container made of fluororesin for 24 hours to obtain an evaluation liquid electrolyte.

Example 2

Ethylene carbonate (EC, manufactured by Kishida Chemical Co., Ltd.), ethyl methyl carbonate (EMC, manufactured by Kishida Chemical Co., Ltd.), lithium hexafluorophosphate ($LiPF_6$, manufactured by Kishida Chemical Co., Ltd.), and lithium fluoride (LiF, manufactured by JAPAN PURE CHEMICAL CO., LTD.) were weighed and mixed so as to be EC:EMC:$LiPF_6$:LiF=10:10:5:1 at the molar ratio, and then stirred at 30° C. in a sealed container made of fluororesin for 24 hours to obtain an evaluation liquid electrolyte.

Example 3

Ethyl methyl carbonate (EMC, manufactured by Kishida Chemical Co., Ltd.), dimethyl carbonate (DMC, manufactured by Kishida Chemical Co., Ltd.), lithium hexafluorophosphate ($LiPF_6$, manufactured by Kishida Chemical Co., Ltd.), and lithium fluoride (LiF, manufactured by JAPAN PURE CHEMICAL CO., LTD.) were weighed and mixed so as to be EMC:DMC:$LiPF_6$:LiF=10:10:5:1 at the molar ratio, and then stirred at 30° C. in a sealed container made of fluororesin for 24 hours to obtain an evaluation liquid electrolyte.

Comparative Example 1

Dimethyl carbonate (DMC, manufactured by Kishida Chemical Co., Ltd.), lithium hexafluorophosphate ($LiPF_6$, manufactured by Kishida Chemical Co., Ltd.), and lithium fluoride (LiF, manufactured by JAPAN PURE CHEMICAL CO., LTD.) were weighed and mixed so as to be DMC:$LiPF_6$:LiF=20:5:1 at the molar ratio, and then stirred at 30° C. in a sealed container made of fluororesin for 24 hours to obtain an evaluation liquid electrolyte.

Comparative Example 2

A mixture solvent in which ethylene carbonate (EC) and dimethyl carbonate (DMC) were mixed at the volume ratio of 1:1 (manufactured by Kishida Chemical Co., Ltd.), lithium hexafluorophosphate ($LiPF_6$, manufactured by Kishida Chemical Co., Ltd.), and lithium fluoride (LiF, manufactured by JAPAN PURE CHEMICAL CO., LTD.) were weighed and mixed so as to be the mixture solvent:$LiPF_6$:LiF=20:5:1 at the molar ratio, and then stirred at 30° C. in a sealed container made of fluororesin for 24 hours to obtain an evaluation liquid electrolyte.

Comparative Example 3

Ethylene carbonate (EC, manufactured by Kishida Chemical Co., Ltd.), propylene carbonate (PC, manufactured by Kishida Chemical Co., Ltd.), dimethyl carbonate (DMC, manufactured by Kishida Chemical Co., Ltd.), lithium hexafluorophosphate ($LiPF_6$, manufactured by Kishida Chemical Co., Ltd.), and lithium fluoride (LiF, manufactured by JAPAN PURE CHEMICAL CO., LTD.) were weighed and mixed so as to be EC:PC:DMC:$LiPF_6$:LiF=2.5:7.5:10:5:1 at the molar ratio, and then stirred at 30° C. in a sealed container made of fluororesin for 24 hours to obtain an evaluation liquid electrolyte.

Comparative Example 4

Propylene carbonate (PC, manufactured by Kishida Chemical Co., Ltd.), lithium hexafluorophosphate ($LiPF_6$, manufactured by Kishida Chemical Co., Ltd.), and lithium fluoride (LiF, manufactured by JAPAN PURE CHEMICAL CO., LTD.) were weighed and mixed so as to be PC:$LiPF_6$:LiF=20:5:1 at the molar ratio, and then stirred at 30° C. in a sealed container made of fluororesin for 24 hours to obtain an evaluation liquid electrolyte.

Comparative Example 5

Propylene carbonate (PC, manufactured by Kishida Chemical Co., Ltd.), ethyl methyl carbonate (EMC, manufactured by Kishida Chemical Co., Ltd.), lithium hexafluorophosphate ($LiPF_6$, manufactured by Kishida Chemical Co., Ltd.), and lithium fluoride (LiF, manufactured by JAPAN PURE CHEMICAL CO., LTD.) were weighed and mixed so as to be PC:EMC:$LiPF_6$:LiF=10:10:5:1 at the molar ratio, and then stirred at 30° C. in a sealed container made of fluororesin for 24 hours to obtain an evaluation liquid electrolyte.

Comparative Example 6

Propylene carbonate (PC, manufactured by Kishida Chemical Co., Ltd.), diethyl carbonate (DEC, manufactured by Kishida Chemical Co., Ltd.), lithium hexafluorophosphate ($LiPF_6$, manufactured by Kishida Chemical Co., Ltd.), and lithium fluoride (LiF, manufactured by JAPAN PURE CHEMICAL CO., LTD.) were weighed and mixed so as to be PC:DEC:$LiPF_6$:LiF=10:10:5:1 at the molar ratio, and then stirred at 30° C. in a sealed container made of fluororesin for 24 hours to obtain an evaluation liquid electrolyte.

Comparative Example 7

A mixture solvent in which ethylene carbonate (EC) and diethyl carbonate (DEC) were mixed at the volume ratio of 1:1 (manufactured by Kishida Chemical Co., Ltd.), lithium hexafluorophosphate ($LiPF_6$, manufactured by Kishida Chemical Co., Ltd.), and lithium fluoride (LiF, manufactured by JAPAN PURE CHEMICAL CO., LTD.) were weighed and mixed so as to be the mixture solvent:$LiPF_6$:LiF=20:5:1 at the molar ratio, and then stirred at 30° C. in a sealed container made of fluororesin for 24 hours to obtain an evaluation liquid electrolyte.

Comparative Example 8

Ethyl methyl carbonate (EMC, manufactured by Kishida Chemical Co., Ltd.), lithium hexafluorophosphate (LiPF$_6$, manufactured by Kishida Chemical Co., Ltd.), and lithium fluoride (LiF, manufactured by JAPAN PURE CHEMICAL CO., LTD.) were weighed and mixed so as to be EMC: LiPF$_6$:LiF=20:5:1 at the molar ratio, and then stirred at 30° C. in a sealed container made of fluororesin for 24 hours to obtain an evaluation liquid electrolyte.

Comparative Example 9

Diethyl carbonate (DEC, manufactured by Kishida Chemical Co., Ltd.), ethyl methyl carbonate (EMC, manufactured by Kishida Chemical Co., Ltd.), lithium hexafluorophosphate (LiPF$_6$, manufactured by Kishida Chemical Co., Ltd.), and lithium fluoride (LiF, manufactured by JAPAN PURE CHEMICAL CO., LTD.) were weighed and mixed so as to be DEC:EMC:LiPF$_6$:LiF=10:10:5:1 at the molar ratio, and then stirred at 30° C. in a sealed container made of fluororesin for 24 hours to obtain an evaluation liquid electrolyte.

[Evaluations]

(Cyclic Voltammetry Measurement)

A CV measurement was conducted for the evaluation liquid electrolytes obtained in Examples 1 to 3 and Comparative Examples 1 to 9. In particular, a dip-type 3-electrodes cell was produced in a glove box under an Ar atmosphere. A Mg plate was used as a working electrode, and a mixture electrode of PTFE, acetylene black (AB), and carbon fluoride was used as a counter electrode. Incidentally, the mixture electrode was an electrode that contained the materials at the weight ratio of PTFE:AB:carbon fluoride=1: 2:7. Also, a reference electrode was separated from the liquid electrolyte by a Vycor glass. Incidentally, the reference electrode used was a Ag line soaked in an acetonitrile solution in which silver nitrate and tetrabutylammonium perchlorate were dissolved in the concentration of 0.1 M respectively. The measurement was conducted in the conditions of at a room temperature and sweeping speed of 1 mV/s.

The coulomb efficiency was calculated by dividing the oxidation electric quantity by the reduction electric quantity. The oxidation electric quantity and the reduction electric quantity were determined from the electric quantity before and after the oxidation current peak and the reduction current peak respectively. In particular, the oxidation electric quantity was determined from the oxidation current of 0.3 V to 0.9 V in the third cycle. The reduction electric quantity was determined from the reduction current of 0.7 V to 0.2 V in the third cycle. Also, the potential correction of each liquid electrolyte (correction to the Li/Li$^+$ basis) was conducted based on the result of dissolving and precipitating Li on a Ni electrode in advance. The results are shown in FIG. 2A to FIG. 6 and Table 1.

TABLE 1

| | Solvent | Coulomb efficiency |
| --- | --- | --- |
| Example 1 | PC + DMC | 0.715 |
| Example 2 | EC + EMC | 0.706 |
| Example 3 | EMC + DMC | 0.641 |

TABLE 1-continued

| | Solvent | Coulomb efficiency |
| --- | --- | --- |
| Comparative Example 1 | DMC | 0.606 |
| Comparative Example 2 | EC + DMC | 0.446 |
| Comparative Example 3 | EC + PC + DMC | 0.266 |
| Comparative Example 4 | PC | 0.539 |
| Comparative Example 5 | PC + EMC | 0.515 |
| Comparative Example 6 | PC + DEC | 0.607 |
| Comparative Example 7 | EC + DEC | 0.628 |
| Comparative Example 8 | EMC | Unmeasurable |
| Comparative Example 9 | DEC + EMC | 0.605 |

Figure 2A:
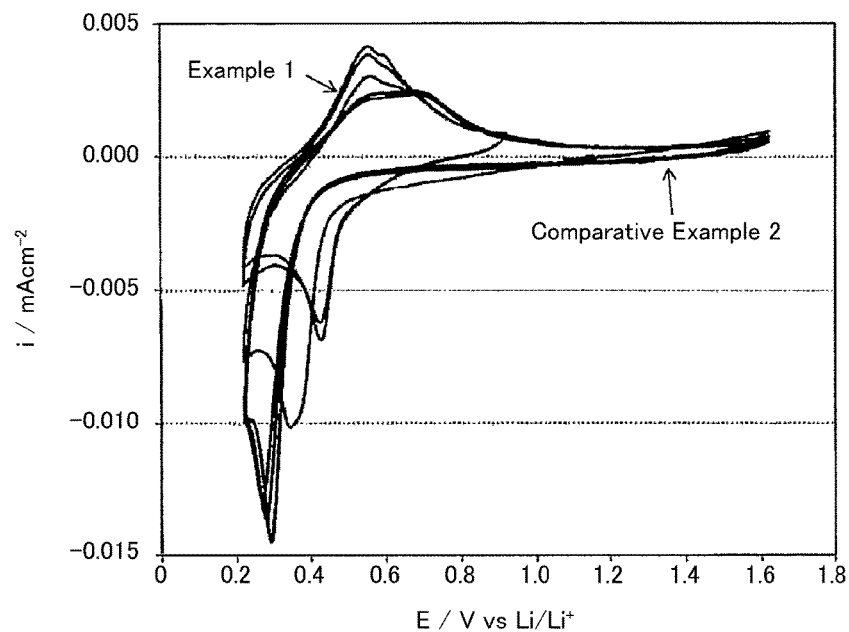
FIGS. 2A to 2C are the results of CV measurements for the evaluation liquid electrolyte obtained in Example 1 and Comparative Example 2.
Figure 2B:
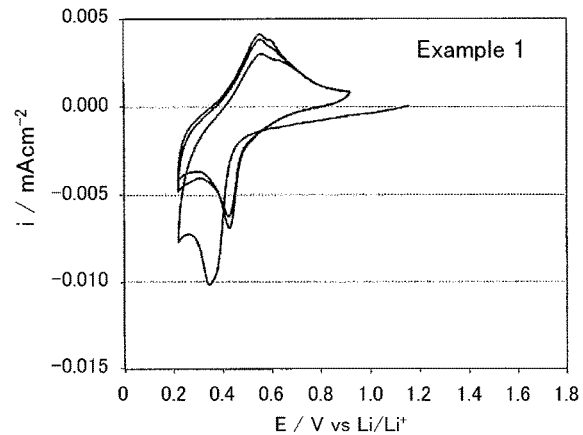
Figure 2C:
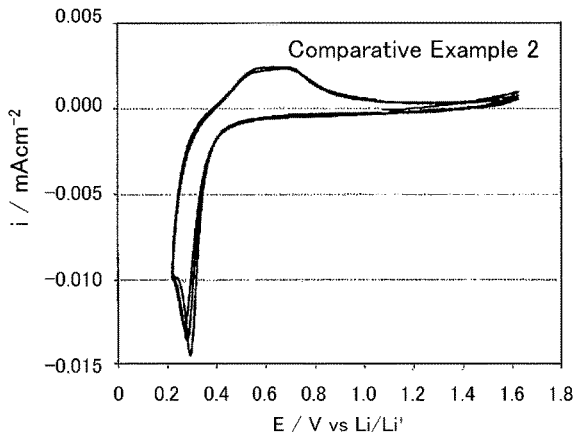

The results of Example 1 and Comparative Example 2 are shown in FIGS. 2A to 2C. As shown in FIGS. 2A to 2C, it was confirmed that the difference between the oxidation and reduction electric quantities (the area of the oxidation reduction current peak) seen in the vicinity of 0.4 V was smaller in Example 1 than that in Comparative Example 2, which meant that the decomposition of the solvent was restrained. Accordingly, improvement in the cycle stability of the battery can be expected. In this manner, the liquid electrolyte with a stable electrode reaction activity was obtained by the combination of the specific carbonate-based solvents.

Figure 3:
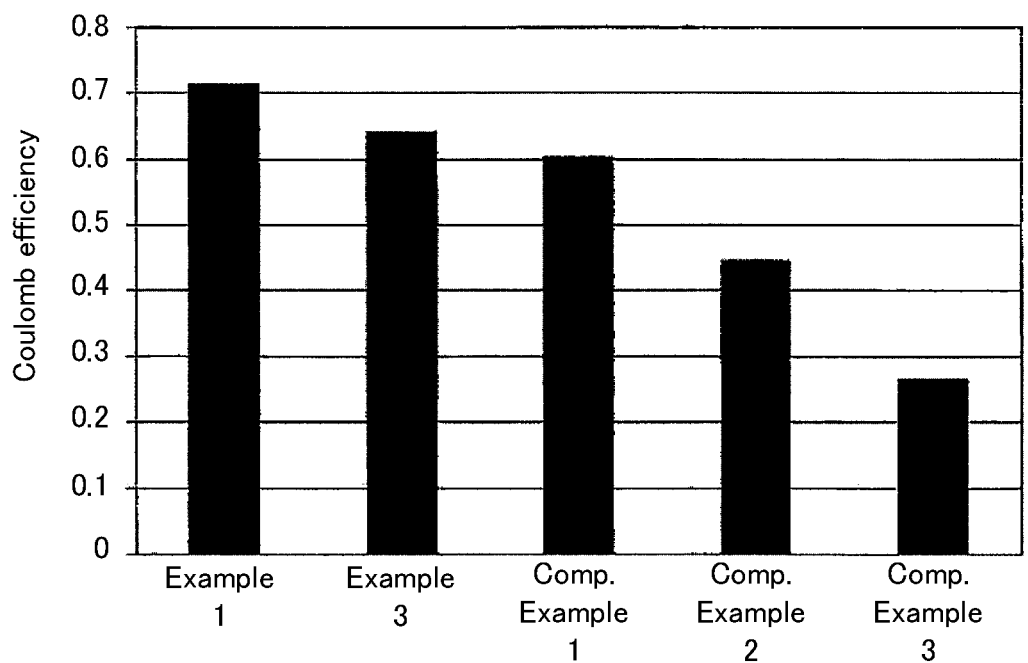
FIG. 3 is the result of a coulomb efficiency measurement for the evaluation liquid electrolyte obtained in Examples 1, 3 and Comparative Examples 1 to 3.

FIG. 3 shows the coulomb efficiency in the liquid electrolytes that contain DMC. As the result, higher coulomb efficiency that was 0.7 or more was obtained with the mixture solvent of PC and DMC (in Example 1) than with DMC alone (in Comparative Example 1) and the mixture solvent of DMC and EC (in Comparative Example 2). Also, higher coulomb efficiency was obtained with the mixture solvent of DMC and EMC (in Example 3) than with DMC alone (in Comparative Example 1). Meanwhile, the coulomb efficiency of the mixture solvent of DMC, PC and EC (in Comparative Example 3) was lower than those not containing EC in Example 1 (DMC+PC) and Comparative Example 1 (DMC). Accordingly, it was suggested that the stability of the SEI layer was degraded due to the addition of EC. From these results, it was suggested that the improvement of the coulomb efficiency was not by the effect of DMC, but the effect of the mixture solvent with the specific combination of the carbonate-based solvents.

Figure 4:
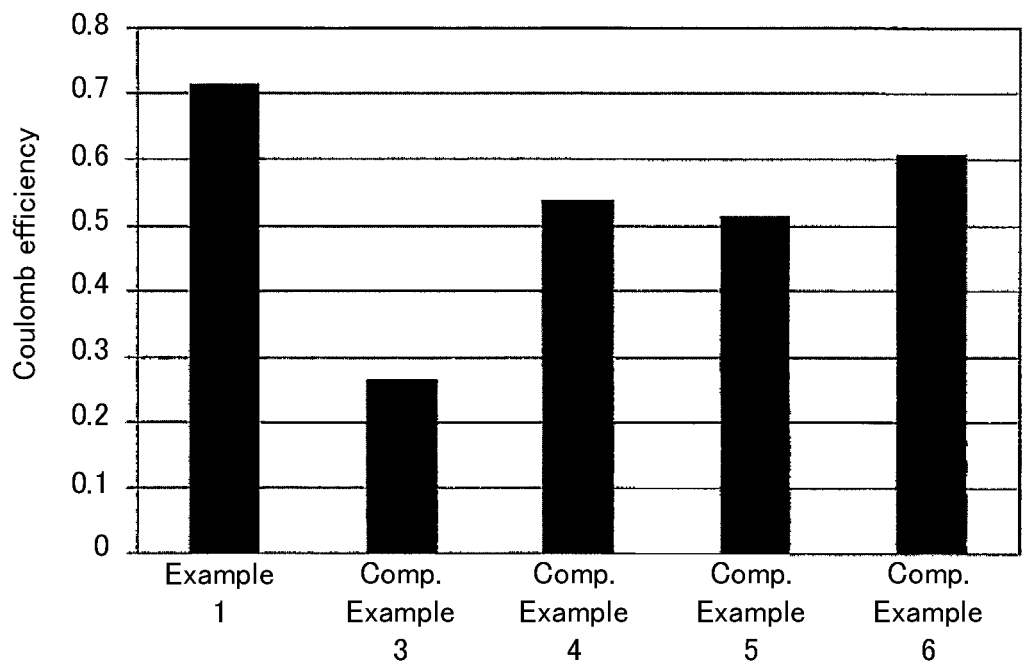
FIG. 4 is the result of a coulomb efficiency measurement for the evaluation liquid electrolyte obtained in Example 1 and Comparative Examples 3 to 6.

FIG. 4 shows the coulomb efficiency in the liquid electrolytes that contain PC. As the result, higher coulomb efficiency that was 0.7 or more was obtained with the mixture solvent of PC and DMC (in Example 1) than with PC alone (in Comparative Example 4), the mixture solvent of PC and EMC (in Comparative Example 5), and the mixture solvent of PC and DEC (in Comparative Example 6). Meanwhile, the coulomb efficiency of the mixture solvent of PC, DMC and EC (in Comparative Example 3) was lower than those not containing EC in Example 1 (DMC+PC) and Comparative Example 4 (PC). Accordingly, it was suggested that the stability of the SEI layer was degraded due to the addition of EC. From these results, it was suggested that the improvement of the coulomb efficiency was not by the effect of PC, but the effect of the mixture solvent with the combination of the specific carbonate-based solvents.

Figure 5:
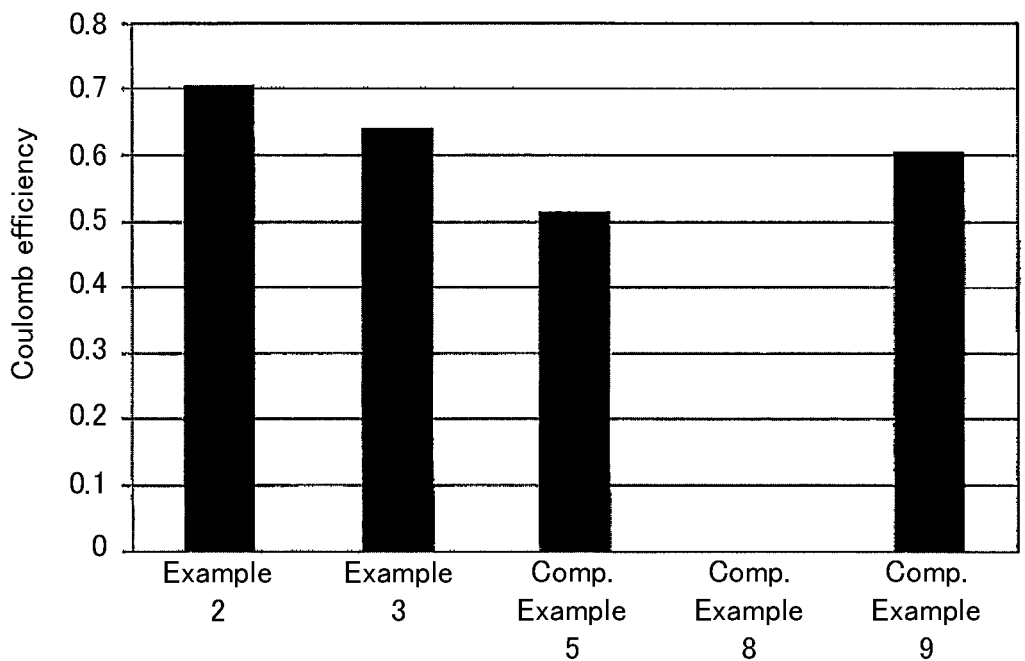
FIG. 5 is the result of a coulomb efficiency measurement for the evaluation liquid electrolyte obtained in Examples 2, 3, and Comparative Examples 5, 8 and 9.

FIG. 5 shows the coulomb efficiency in the liquid electrolytes that contain EMC. As the result, higher coulomb efficiency that was 0.7 or more was obtained with the mixture solvent of EMC and EC (in Example 2) than with EMC alone (in Comparative Example 8), the mixture solvent of EMC and PC (in Comparative Example 5), and the mixture solvent of EMC and DEC (in Comparative Example 9). From these results, it was suggested that the improvement of the coulomb efficiency was not by the effect of EMC, but the effect of the mixture solvent with the combination of the specific carbonate-based solvents.

Figure 6:
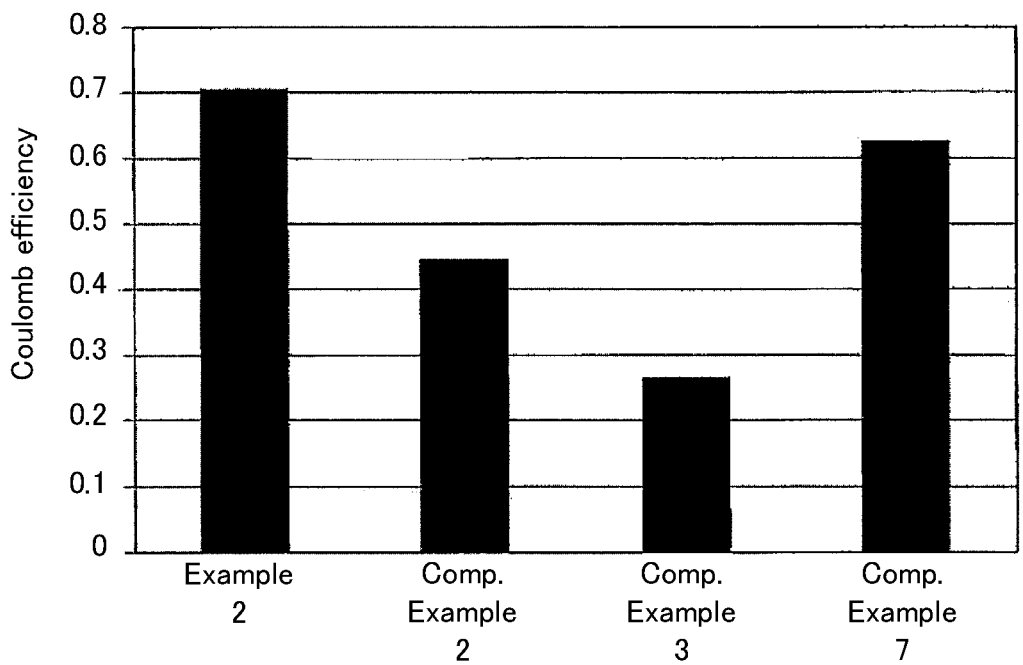
FIG. 6 is the result of a coulomb efficiency measurement for the evaluation liquid electrolyte obtained in Example 2 and Comparative Examples 2, 3 and 7.

FIG. 6 shows the coulomb efficiency in the liquid electrolytes that contain EC. As the result, higher coulomb efficiency that was 0.7 or more was obtained with the mixture solvent of EC and EMC (in Example 2) than with the mixture solvent of EC and DMC (in Comparative Example 2), the mixture solvent of EC, PC, and DMC (in Comparative Example 3), and the mixture solvent of EC and DEC (in Comparative Example 7). From these results, it was suggested that the improvement of the coulomb efficiency was not by the effect of EC, but the effect of the mixture solvent with the combination of the specific carbonate-based solvents.

Also, in view of Comparative Example 1 (DMC) basis, the coulomb efficiency decreased when EC was added (in Comparative Example 2), and the coulomb efficiency further decreased when EC and PC were added (in Comparative Example 3). Accordingly, it was presumed that the coulomb efficiency would decrease if PC was added to DMC; however, in reality, surprisingly, high coulomb efficiency was obtained in Example 1 (DMC+PC).

Also, it was presumed that the properties of PC and EC were in the same level since the coulomb efficiency in the same level was shown in Comparative Example 6 (DEC+PC) and Comparative Example 7 (DEC+EC). In view of Comparative Example 4 (PC) basis, the coulomb efficiency decreased when EMC was added (in Comparative Example 5). Also, neither charge nor discharge occurred with EMC alone (in Comparative Example 8). Accordingly, it was presumed that the coulomb efficiency would decrease if EMC was added to EC; however, in reality, surprisingly, high coulomb efficiency was obtained in Example 2 (EC+EMC).

Also, neither charge nor discharge occurred with EMC alone (in Comparative Example 8). Accordingly, it was presumed that the coulomb efficiency would decrease further than that in Comparative Example 1 (DMC) if EMC was added to DMC; however, in reality, surprisingly, high coulomb efficiency was obtained in Example 3 (EMC+DMC).

REFERENCE SIGNS LIST 1 cathode active material layer
2 anode active material layer
3 electrolyte layer
4 cathode current collector
5 anode current collector
6 battery case
10 fluoride ion battery

What is claimed is:
1. A fluoride ion battery, comprising:
   a cathode active material layer,
   an anode active material layer, and
   an electrolyte layer formed between the cathode active material layer and the anode active material layer, wherein
   the electrolyte layer contains a liquid electrolyte
   the liquid electrolyte comprises a plurality of carbonate-based solvents, a fluoride salt, and a fluoride complex salt,
   a total mole ratio of the plurality of carbonate-based solvents is 90 mol % or higher relative to a total mole ratio of all solvents of the liquid electrolyte,
   the plurality of carbonate-based solvents contain:

i) propylene carbonate (PC) and dimethyl carbonate (DMC), a proportion of the PC with respect to a total of the PC and the DMC (PC/(PC+DMC)) is 15 mol % to 75 mol %, and a proportion of the total of the PC and the DMC with respect to all of the plurality of carbonate-based solvents is 95 mol % or higher,
   ii) ethylene carbonate (EC) and ethyl methyl carbonate (EMC), a proportion of the EC with respect to a total of the EC and the EMC (EC/(EC+EMC)) is 15 mol % to 75 mol %, and a proportion of the total of the EC and the EMC with respect to all of the plurality of carbonate-based solvents is 95 mol % or higher, or
   iii) ethyl methyl carbonate (EMC) and dimethyl carbonate (DMC), a proportion of the EMC with respect to a total of the EMC and the DMC (EMC/(EMC+DMC)) is 15 mol % to 75 mol %, and a proportion of the total of the EMC and the DMC with respect to all of the plurality of carbonate-based solvents is 95 mol % or higher,
   fluoride ions are produced from the anode material contained in the anode active material layer at a time of charging the fluoride ion battery,
   a cation of the fluoride complex salt is lithium, and
   a proportion B/A is 0.125 or more, when an amount of all solvents in the liquid electrolyte is regarded as A (mol) and an amount of the fluoride complex salt in the liquid electrolyte is regarded as B (mol).

2. The fluoride ion battery according to claim 1, wherein the plurality of carbonate-based solvents contain the propylene carbonate (PC) and the dimethyl carbonate (DMC).

3. The fluoride ion battery according to claim 1, wherein the plurality of carbonate-based solvents contain the ethylene carbonate (EC) and the ethyl methyl carbonate (EMC).

4. The fluoride ion battery according to claim 1, wherein the plurality of carbonate-based solvents contain the ethyl methyl carbonate (EMC) and the dimethyl carbonate (DMC).

5. The fluoride ion battery according to claim 1, wherein the fluoride salt includes LiF.

6. The fluoride ion battery according to claim 1, wherein the plurality of carbonate-based solvents is the only solvent of the liquid electrolyte.

7. The fluoride ion battery according to claim 1, wherein the liquid electrolyte contains another solvent in addition to the plurality of carbonate-based solvents.

8. The fluoride ion battery according to claim 1, wherein a total mole ratio of the plurality of carbonate-based solvents is 100 mol % of all solvents of the liquid electrolyte.

9. The fluoride ion battery according to claim 2, wherein propylene carbonate (PC) and dimethyl carbonate (DMC) are the only solvents of the liquid electrolyte.

10. The fluoride ion battery according to claim 3, wherein ethylene carbonate (EC) and ethyl methyl carbonate (EMC) are the only solvents of the liquid electrolyte.

11. The fluoride ion battery according to claim 4, wherein ethyl methyl carbonate (EMC) and dimethyl carbonate (DMC) are the only solvents of the liquid electrolyte.

12. The fluoride ion battery according to claim 1, wherein the proportion of the total of the PC and the DMC with respect to all of the plurality of carbonate-based solvents is 99 mol % or higher.

13. The fluoride ion battery according to claim 1, wherein the proportion of the total of the EC and the EMC with respect to all of the plurality of carbonate-based solvents is 99 mol % or higher.

14. The fluoride ion battery according to claim 1, wherein the proportion of the total of the EMC and the DMC with respect to all of the plurality of carbonate-based solvents is 99 mol % or higher.

15. The fluoride ion battery according to claim 1, wherein the proportion of the PC with respect to a total of the PC and the DMC (PC/(PC+DMC)) is 25 mol % to 67 mol %.

16. The fluoride ion battery according to claim 1, wherein the proportion of the EC with respect to a total of the EC and the EMC (EC/(EC+EMC)) is 25 mol % to 67 mol %.

17. The fluoride ion battery according to claim 1, wherein the proportion of the EMC with respect to a total of the EMC and the DMC (EMC/(EMC+DMC)) is 25 mol % to 67 mol %.

* * * * *